United States Patent [19]

Küttenbaum

[11] Patent Number: 4,619,545
[45] Date of Patent: Oct. 28, 1986

[54] FRAME ASSEMBLY

[76] Inventor: Valentin Küttenbaum, Ringelhauser Allee 14, D-7958 Laupheim, Fed. Rep. of Germany

[21] Appl. No.: 800,364

[22] Filed: Nov. 21, 1985

Related U.S. Application Data

[63] Continuation of Ser. No. 487,120, Apr. 21, 1983, abandoned.

[30] Foreign Application Priority Data

Apr. 22, 1982 [DE] Fed. Rep. of Germany ....... 3215018

[51] Int. Cl.[4] .................... F16B 7/04; F16D 1/06
[52] U.S. Cl. .................... 403/169; 403/290; 403/344; 403/373; 403/385
[58] Field of Search ............... 403/344, 290, 362, 289, 403/385, 399, 400, 373, 398, 169

[56] References Cited

U.S. PATENT DOCUMENTS

| 2,308,698 | 1/1943 | Lee | 403/385 |
| 3,338,602 | 8/1967 | Arnd | 403/362 |
| 3,360,883 | 1/1968 | Glanzer | 403/289 |
| 3,612,585 | 10/1971 | Mayr | 403/230 |
| 4,116,572 | 9/1978 | Heidmann et al. | 403/344 |
| 4,207,014 | 6/1980 | Worrallo | 403/344 |

FOREIGN PATENT DOCUMENTS

| 1171137 | 8/1960 | France | 403/385 |
| 1233609 | 10/1960 | France | 403/385 |
| 414122 | 1/1946 | Italy | 403/385 |
| 602208 | 5/1948 | United Kingdom | 403/385 |

Primary Examiner—Cornelius J. Husar
Assistant Examiner—Peter M. Cuomo
Attorney, Agent, or Firm—Karl F. Ross; Herbert Dubno

[57] ABSTRACT

A device for interconnecting frame elements or connecting frame elements releasably to a support or other structure has a pair of clamping jaws of rectangular parallelopipedal configuration so that the tightening of the screw at one end of the jaws clamp the same against a frame element. At the other end, the jaws are provided with ribs adapted to slide into a channel forming a bridge whose hooks engage over these ribs.

11 Claims, 17 Drawing Figures

FRAME ASSEMBLY

This is a continuation of co-pending application Ser. No. 487,120 filed on Apr. 21, 1983, now abandoned.

FIELD OF THE INVENTION

My present invention relates to a frame, rack or like assembly having junction members releasably or detachably interconnecting the frame or rack elements. More particularly, the invention relates to a device for the releasable connection of a frame element to another member and especially a frame element of circular cross section.

BACKGROUND OF THE INVENTION

It is known to provide, for racks, shelves, three-dimensional latticeworks and other articles for office, factory, institutional or household use, e.g. as a bin support, a frame assembly which comprises a plurality of relatively elongated frame elements interconnected at their ends or connected at their ends to support or other structures by releasable connecting members, each of which may have a pair of jaws or halves which clamp the element between them.

With the aid of such releasable or detachable connecting members, it is possible to assemble such a frame structure relatively quickly, to readily disassemble the frame structure or to alter the configuration of the frame structure for the particular needs of the household, office or the like. Up to now, the connecting members have had to be of special shape and relatively complex configuration and this shape or configuration would vary depending upon the position of the connecting member, i.e. whether it was located at a corner or only an edge of the frame assembly, and in accordance with the particular type of connection intended, i.e. whether the connection was to another similar frame element, to a support structure or to some other body.

Thus, it could generally be said that the shape of the connecting member depended upon the configuration or nature of the noncircular structure to which the circular cross-section frame element was to be connected.

This had the disadvantage that a considerable variety of connecting members had to be provided and kept on hand. The versatility of the system was minimal because of the need to use special parts for special purposes both at the attachment to the frame elements and at the attachment to any support or length structure to which the frame element was to be connected.

OBJECTS OF THE INVENTION

It is the principal object of the present invention to provide a simplified frame assembly whereby the disadvantages of the prior structures described are obviated.

Another object of this invention is to provide a low cost highly versatile connecting member for a frame assembly of the type described.

Still another object of this invention is to provide an easily fabricated, easily used detachable connecting member for the frame elements of a frame, rack or like assembly for household, office or other use.

SUMMARY OF THE INVENTION

These objects and others which will become apparent hereinafter are attained, in accordance with the present invention, which provides a connecting member for circular cross-section frame elements which has a generally rectangular parallelopipedal configuration and which is subdivided into two jaws or halves formed with confronting recesses adapted to receive the circular cross section frame element with which this member is to be used.

According to the invention, at one end of each connecting member, a traction means is provided for drawing the two jaws or member jaws toward one another, thereby clamping the frame element between them, while at the other end of the connecting member each of two halves or jaws has an outwardly extending ledge over which a hook-shaped formation of a channel or bridge piece can engage, this channel holding the two halves or jaws together. The channel or bridge piece is thus slid over this other end of the connecting member or, conversely, this other end of the connecting member is slid into the hooks of the channel to assemble the connecting member and frame to another structure.

The outwardly projecting ribs of the jaws or halves of the connecting member may each define one side of a respective groove and the hooks formed by the inwardly turned sides of the channel or bridge can be slidably received in these grooves according to a feature of the invention.

The principal advantage of the present invention is that apart from the bridge, all of the elements of the frame can be identical. Thus, the connecting member with its jaws and traction or clamping means can be identical for all of the joints between frame elements. The channel or bridge, moreover, can be readily shaped or connected to other bodies or structures which can have two or more such channels to permit corner joints for a number of connecting elements to be achieved simply by sliding the connecting members into hooks of the channel.

Similarly, one or more channels can be provided on support or other structures to allow the connecting members and the frame elements to be readily mounted thereon.

According to another feature of the invention which results in an especially simple and desirable assembly, the structure to which the frame element is to be connected is formed directly from one or more channels so that the channel can close the aforementioned other end of the connecting member and serve as a structural element of the unit as well.

To connect a number of frame elements in, say a substantially circular structure, the channels can have angularly or arcuately adjoining portions each of which can receive a respective one of the two-part connecting members and the frame element clamped therein. For other configurations of the frame structure, corner or junction pieces, which are multipartite and each of which consists of a respective channel, can be used, the channels lying at angles to one another.

When a relative movement of two frame elements is desired, one of the body parts may be hinged for a swinging movement relative to the other part of a junction body.

According to a further feature of the invention, the junction body can comprise two bracket-shaped or hook portions which can form between them a device for clamping a frame element which does not itself have to have a circular cross section and which can be connected to the circular cross section frame elements when the respective two-part connecting members are slid into these channels.

The junction body or bridge can also be deformable or distortable to reduce the cross section of a clamping portion when the connecting member is forced into the channel or is spread therein for example, thereby permitting arms or portions of the junction body to grip securely another member. The bridge can be made of two relatively displaceable portions pivoting in tongs or scissor configuration, if desired, or in a single piece.

Preferably, the two sides of the body are connected to respective arms and these arms or parts of the junction body are articulated to one another through a deformable portion of the junction body which can be made of an elastically deformable synthetic resin material.

Furthermore, the two halves of the connecting member, i.e. the clamping jaws, in the region of their separation and proximal to the end provided with the outwardly extending ledges are interconnected with an elastic means so that these jaws form a unit and can be more easily mounted and dismounted together.

According to yet another feature of that invention, the bridge is elastically deformable and is provided generally centrally with a tension bolt which can project from the bridge away from the clamping jaws or halves and which serves for a tensiontype connection to other members of the assembly, a rigid wall or the like.

Such bolt or screw can be threaded into an opening of the bridge or can simply traverse the latter. This arrangement greatly simplifies the connection of the bridge to other frame elements of the support structures and the bolt can also serve as a pivot or axis which allows a certain swinging movement. Naturally, this swinging movement is lost as the bolt spanning the jaws is tightened.

The bridge and clamping member can be shaped so that the forces applied to the hooks tend to bend the bridge so as to be convex toward the clamping jaws. In this construction with relatively little force against adjoining elements, the bridge can be clamped thereagainst, undesired rotation can be eliminated and the structural integrity can be improved since the clamping member is braced against the bridge and the bridge against a support wall or the like.

BRIEF DESCRIPTION OF THE DRAWING

The above and other objects, features and advantages of the present invention will become more readily apparent from the following description, reference being made to the accompanying drawing in which:

FIG. 5a is a perspective view showing a junction body having two bridges for receiving respective clamping members and provided with a hole through which the body can be anchored at a support or the like;

SPECIFIC DESCRIPTION

Figure 1:
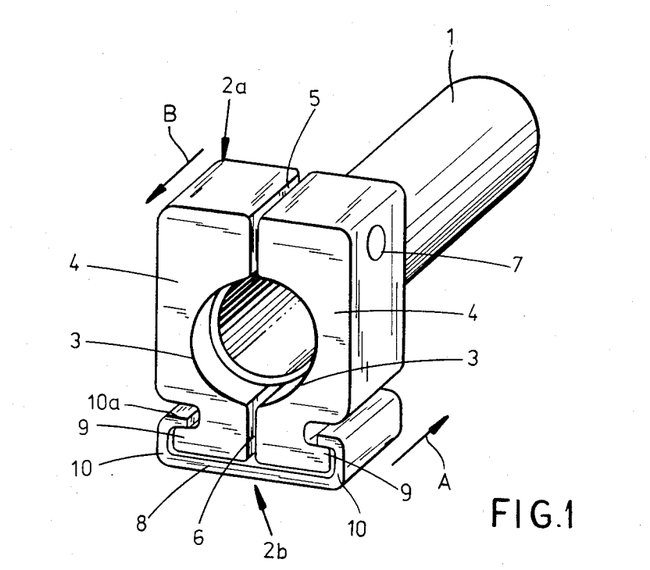
FIG. 1 is a diagrammatic perspective view showing the basic elements of an assembly in accordance with the invention.
Figure 2A:
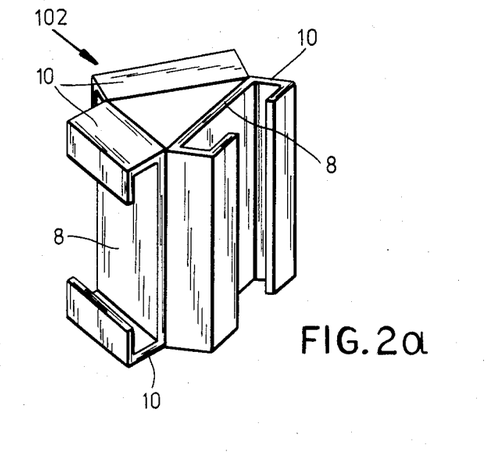
FIG. 2a is a perspective view of a junction body which can be used with a connecting member of FIG. 1.
Figure 2B:
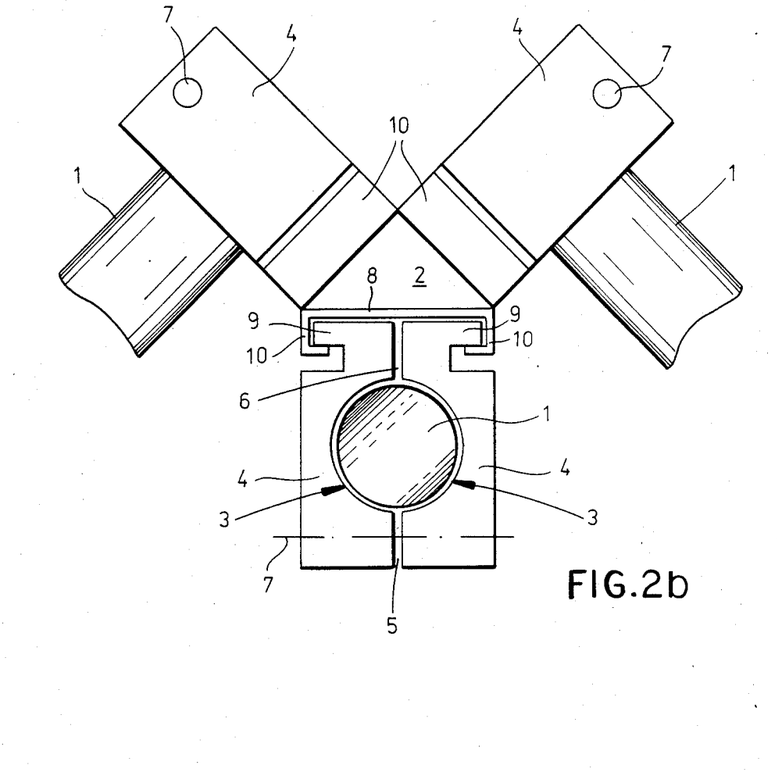
FIG. 2b is an end view of the junction body showing three frame elements connected thereto.

The releasable connector for a frame element 1 shown in FIGS. 1 and 2, where this frame element is of substantially circular cross section, comprises the clamping member 2a and the bridge member 2b. The clamping member 2a comprises two clamping jaws or halves 4 each of which is provided with a substantially semicylindrical recess 3 formfitting with the frame element 1 and separated from one another by a pair of slits 5 and 6 extending diametrically opposite one another to opposite sides of the frame element 1.

Figure 1A:
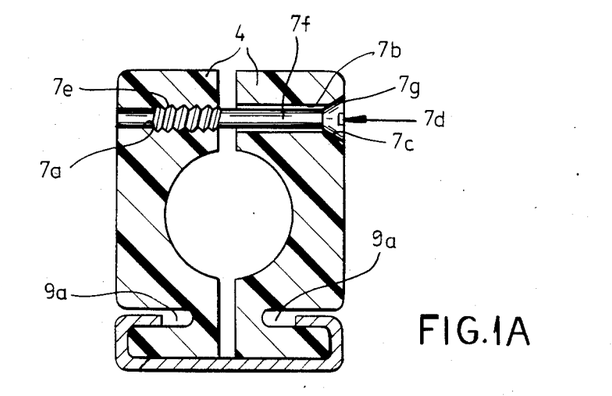
FIG. 1A is a cross section of the frame assembly of FIG. 1.

The clamping member 2a is of rectangular parallelopipedal configuration and at one end is provided with a traction means for drawing the two halves together against the frame element 1. The traction means 1 is generally represented at 7 and comprises, as shown in FIG. 1a a threaded bore 7a in one of the clamping jaws, a nonthreaded bore 7b registering with the threaded bore 7a, a countersink 7c coaxial with the bore 7b, and a bolt or screw 7d. The bolt or screw 7d has a threaded portion 7e threadedly engaging the screwthread 7a and an unthreaded shank 7f connecting said threaded portion to the slotted head 7b. Thus, when the screw is tightened, the two members 4 are drawn together to clamp the frame element 1 between them.

At the opposite end of the member 2a, closing the slit 6, I provide a bridge 8 which forms a body or is connected to a body 2b which can support the frame or form part of the frame.

As can be seen from FIGS. 1 and 1A, this end of member 2a is provided with a pair over ribs or lateral projections 9 of which hooks 10 of the bridge 8 engage to hold these ends of the clamping heads together.

The projections or ribs can be defined by grooves 9a, formed in the clamping hubs 4 and accommodating the inwardly turned edges 10a of the hooks. Thus the bridge can be slid onto the bottom of the connecting member 2a in the direction of arrow A in a dovetail fit, or the connecting member 2a can be shifted in the direction of arrow B while the bridge 8 is held stationary to fit the two parts together.

The bridge 8, as noted, can be connected to other parts of the frame. For example, as shown in FIG. 2a a plurality of bridges 8 can be connected together, e.g. by welding, and at various angles and at various orientations. This allows, as shown in FIG. 2b, three frame elements to be joined together at the junction body 102.

Figure 3:
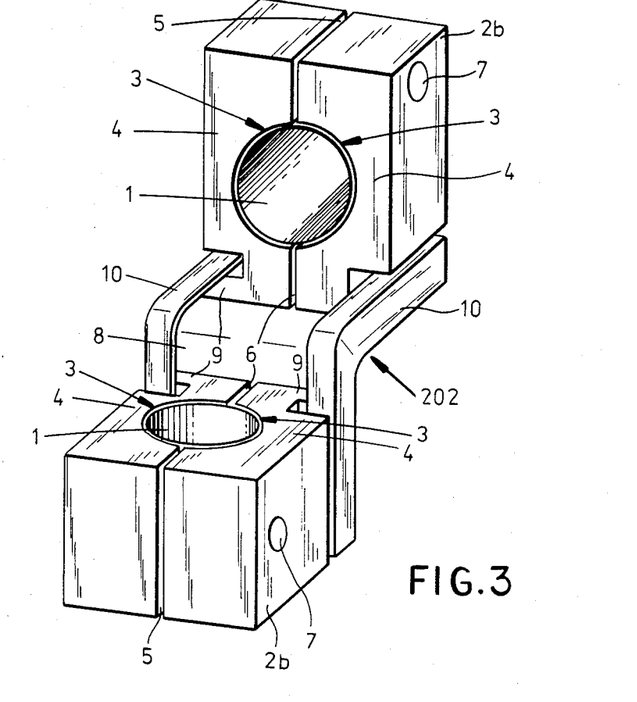
FIG. 3 is a perspective view showing the connection of two tubelike elements at right angles to one another.

In FIG. 3, I have shown an arrangement in which a single channel 8 is provided with a right angle bend to provide two bridge members. In this case, the junction body 202 can serve to connect two connecting members 2b at right angles to one another as well.

Figure 4A:
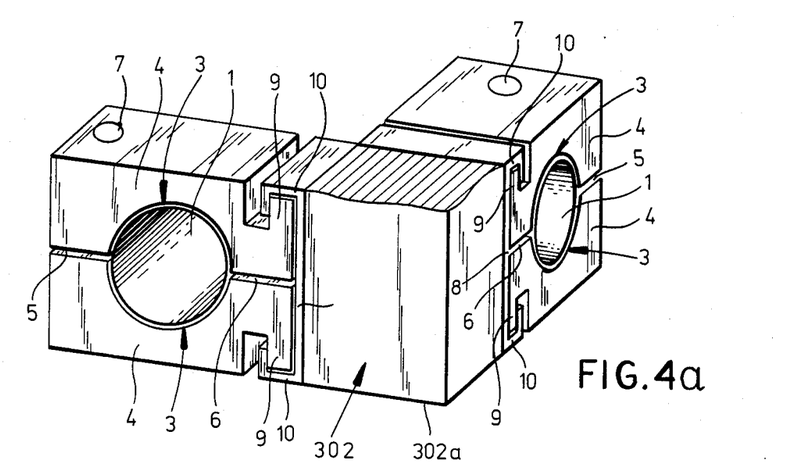
FIG. 4a is a perspective view showing the right-angle connection of two connecting members so that their frame elements lie in the same plane.
Figure 4B:
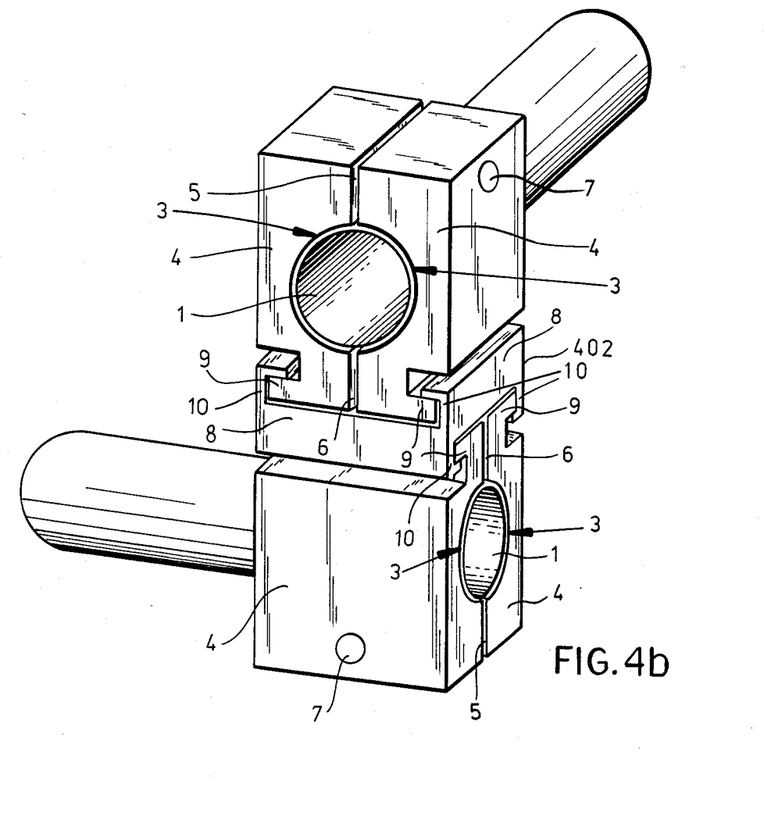
FIG. 4b is a view similar to FIG. 4a showing the members so connected that their frame elements lie in two different planes.

In FIG. 4a, a right angle connection is provided utilizing a junction body 302 which comprises a pair of bridges 8 situated at adjacent faces of a cube or rectangular parallelepiped 302a which can be vertically elongated, if desired, so as to form a stand or the like. The other faces of the rectangular parallelepiped 302a can also receive bridge channels 8 which can be movably attached and can be used or can be left unused. The frame elements here are connected in a common plane. In FIG. 4b, however, the frame elements are not coplanar. In this case, the body 402 is formed unitarily with two channels extending at right angles to one another on opposite sides of this body.

Figure 5A:
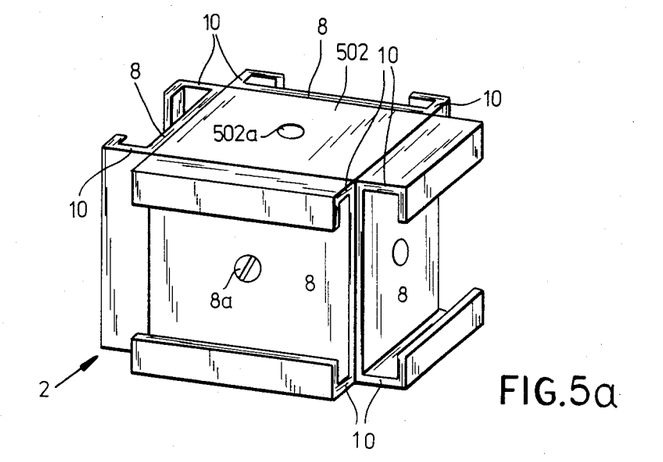

FIG. 5a shows a system which permits four connecting members to be received in respective channels along four vertical faces of the body 502 which is provided with a hole 502a for a screw which can secure the body 502 to some support or other structure. Screws 8a can secure the bridges 8 to the body 502.

Figure 5B:
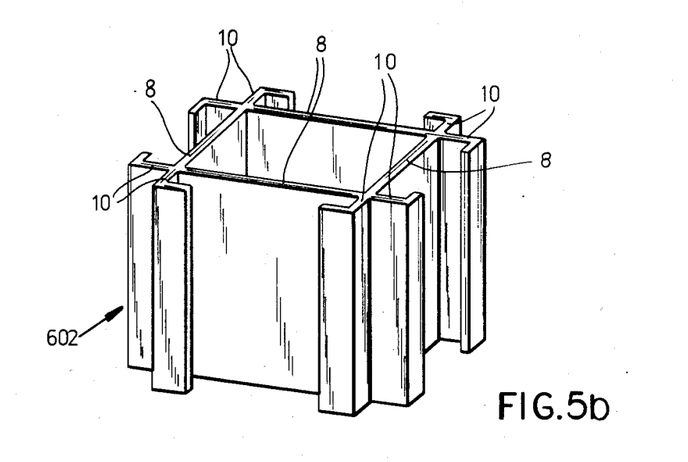
FIG. 5b is a perspective view showing an extruded unitary junction body integrally provided with four bridges.

FIG. 5b shows a similar body 602, but that is centrally open and that has all bridges 8 extending parallel.

Figure 5C:
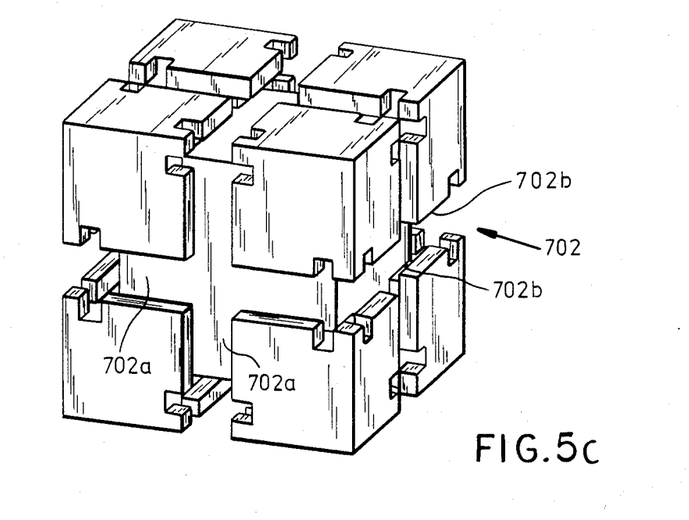
FIG. 5c is a perspective view of still another junction body illustrating another configuration of the bridges.

Another cubic arrangement has been shown in FIG. 5b, where the bridges 8 are all formed unitarily and in one piece on the junction body 602 which can be extruded from aluminum and cut to length. In FIG. 5c, however, a more versatile cubic structure is provided for the body 702. Here, molded into the synthetic resin body, are slots 702a in cruciform pattern into which the connecting member 2a can be inserted in either of two directions and slid along these slots so that overhanging edges 702b for example, form the hooks for retaining the connecting members. Such slots are formed on each of the six faces of the cube.

Figure 6:
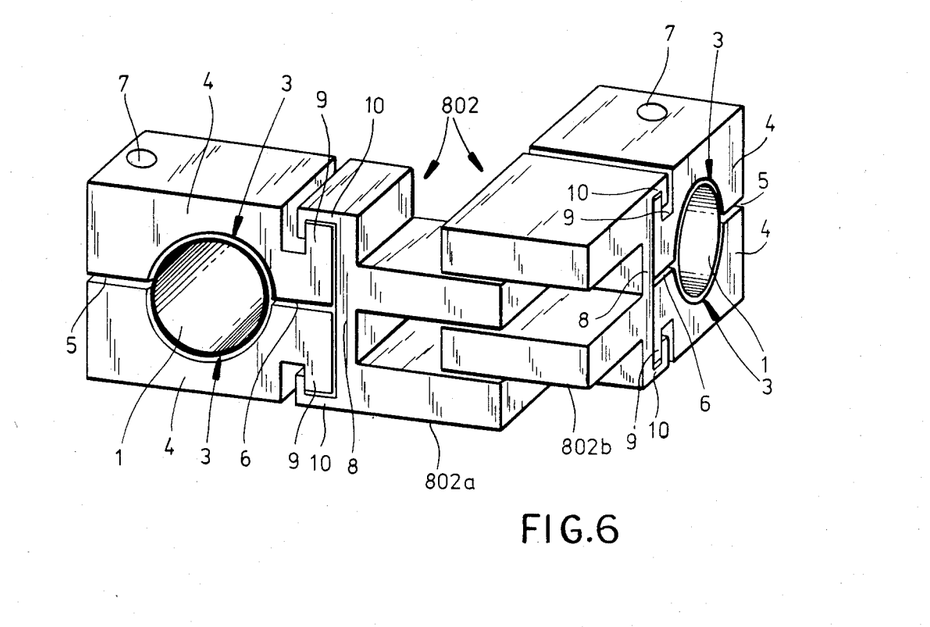
FIG. 6 is a perspective view in partially exploded form showing the connection of two parts of a junction body according to the invention.

The body 802 need not be unitary as can be seen from FIG. 6 and indeed can have two parts 802a and 802b joined together by a hinge, a dado, a dovetail or a mortise-and-tenon joint.

Figure 7A:
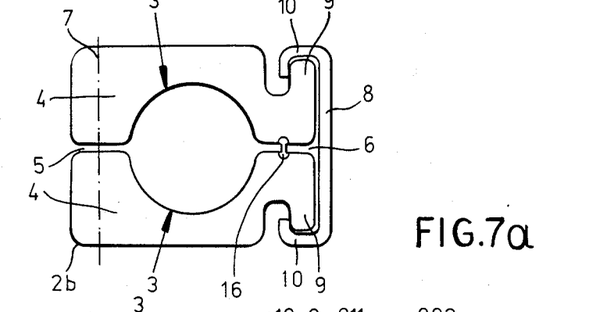
FIG. 7a is an elevational view illustrating another embodiment of the clamping members.

In FIG. 7a, I show that the two clamping jaws forming the clamping member 2b can be interconnected by a flexible link 16, advantageously forcefitted into grooves, proximal to the ribs 9 and bridging the slit 6. Thus, these two jaws are held together by the link 16 when the device is disassembled and are attached together so that assembly is facilitated.

Figure 7B:
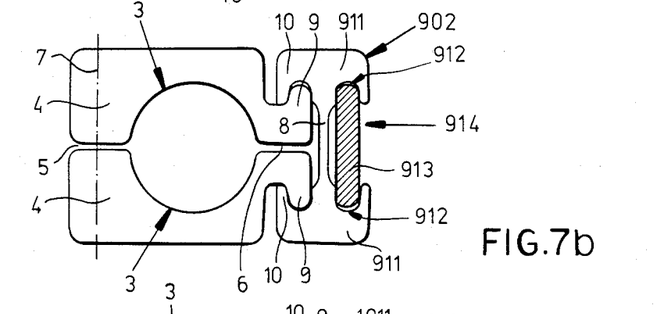
FIG. 7b is a view similar to FIG. 7a but showing a bridge which can also be clamped against another body at least in part by the outward forces on the hook portions of the bridge.
Figure 7C:
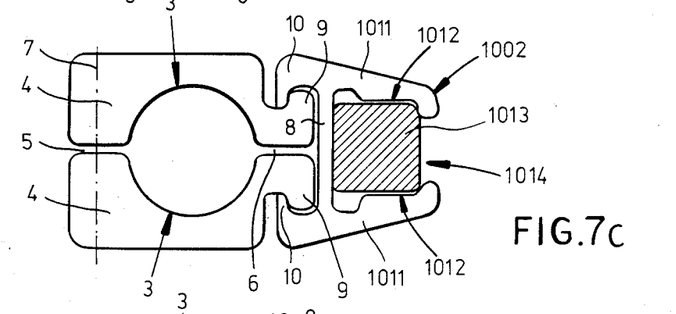
FIGS. 7c and 7d show modifications of the last mentioned concept, also in elevational views.
Figure 7D:
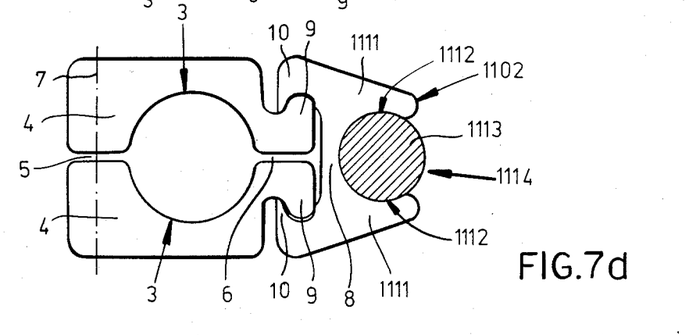

FIGS. 7d through 7d show that each of the bridges 8 of the junction bodies 902, 1002 and 1102, respectively, has a pair of clamping members 11, 911, 1011 and 1111 of bracket shape, defining an opening 914, 1014, 1114 adapted to receive another frame element 913, 1013 or 1113 of the frame or rack structure, regardless of its shape, to secure the clamping member to this other element. The bodies 902, 1002 and 1102 are elastically deformable so that, when the connecting member is inserted into the respective bridge, the arms 911, 1011 or 1111 are swung toward one another to engage the member 913, 1013, 1113 at diametrically opposites sides 912, 1012 and 1112. The recesses 914, 1014, 1114 are formfitting with respect to the member 913, 1013 and 1113 to be received therein.

Figure 8:
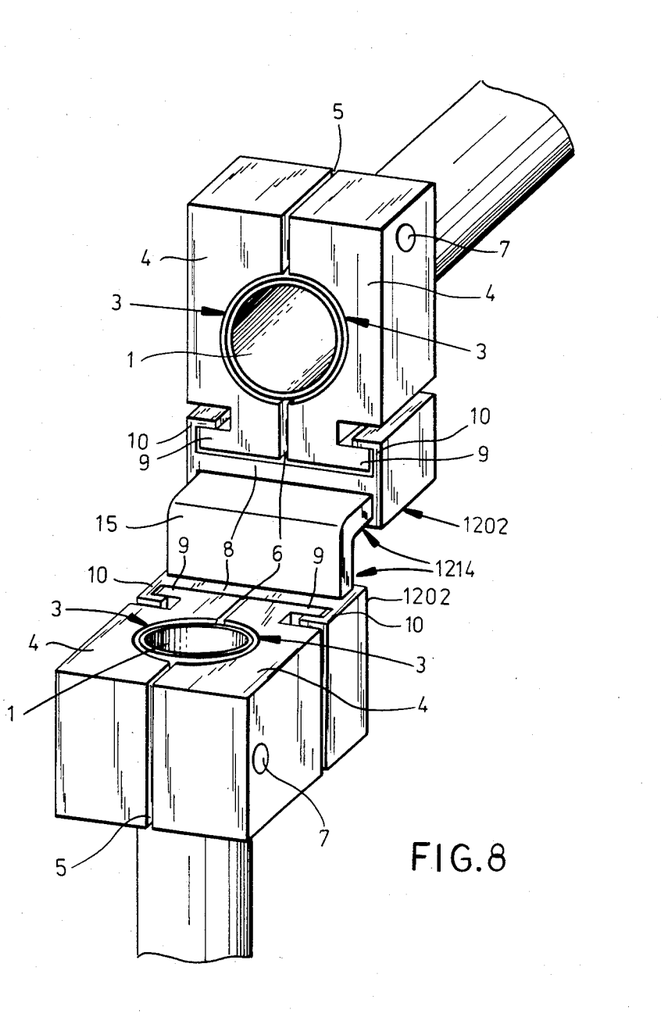
FIG. 8 is a perspective view showing a right-angle connection between two tubular frame elements utilizing the principles of FIGS. 7b through 7d.

In the embodiment of FIG. 8, two frame elements are interconnected utilizing the principles of FIGS. 7d and 7e and here the body 15 is an angle whose tongues are received in the recesses 1214 of a pair of members 1202 in the manner described.

Figure 9:
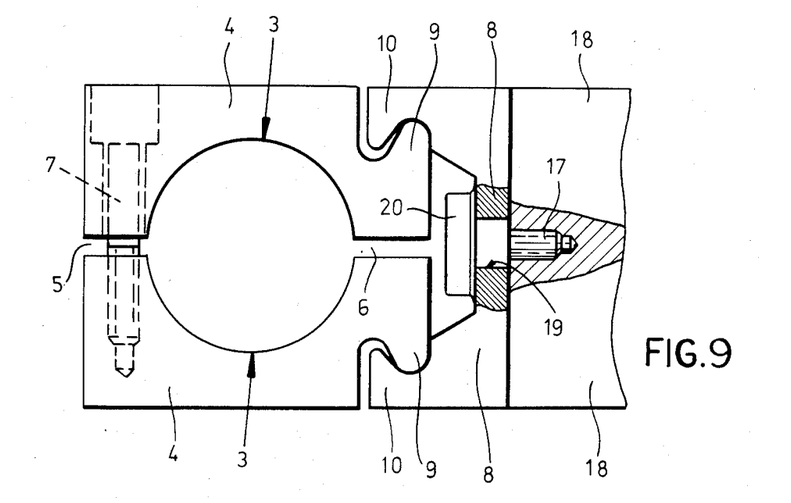
FIG. 9 is a fragmentary elevational view showing another embodiment of the invention.

The embodiment of FIG. 9 utilizes an elastically deformable bridge 8 through which a tension bolt 17 can extend and which projects from the side of the bridge opposite the side receiving the clamping jaw 4 to engage a support, wall or other frame member which, of course, can be provided with a second bridge so that a mirrosymmetrical arrangement of clamping members can be provided if desired.

Head 20 of the screw can be engaged by a screwdriver or the like and is recessed or countersunk in the bridge which is provided with the opening.

When the clamping device 7 is tightened, the projections or ridges 9 are swung outwardly and press outwardly against hooks 10 to tend to bulge the bridge so that it becomes convex toward the members 4. This, of course, prevents relative rotation of the bridge 8 around the screw 17 with respect to the member 18. Loosening of the clamping means 7, of course, can restore this pivotal movement if it is desired.

It has been shown that the clamping member is assembled by the axial movement of one with respect to another.

To prevent relative axial movement when it is not desired, the mutually engaging surfaces of the ridge of the hook can be convexly or concavely bulged, corrugated or otherwise provided with interfitting formations so that undesired axial movement is precluded. The cooperating surfaces may be coaxial cylindrical surfaces which permit the bridge and the clamping member to swing relatively slightly to compensate for tolerances in manufacture.

I claim:

1. A device for releasably connecting an elongated frame element to a generally stationary support, the device comprising:

a pair of like elongated clamping jaws extending generally parallel to and spaced from each other, having inner and outer ends, and formed with confronting recesses embracing the element with the jaws separated by inner and outer slits extending oppositely from the recesses toward the respective ends of the jaws, the outer ends of the jaws being formed with respective oppositely directed ribs;

traction means connected between the inner ends of the jaws for drawing the jaws together at the inner slit while urging the jaws and ribs apart at the outer slit and for thereby clamping the element between the jaws;

a bridge having a pair of sides one of which is formed with a pair of confronting and relatively nondisplaceable hooks engaging over the ribs, whereby spreading of the jaws at the ribs engages the jaws tightly in the bridge; and means for securing the other side of the bridge releasably to the support.

2. The connecting device defined in claim 1 wherein the frame element is of circular section and the recesses are of complementary shape but slightly less than semi-cylindrical.

3. The connecting device defined in claim 1 wherein the bridge is formed with a plurality of such pairs of hooks.

4. The connecting device defined in claim 1 wherein the body is formed of two relatively displaceable and fixable parts.

5. The connecting device defined in claim 4 wherein the two body parts are pivoted together.

6. The connecting device defined in claim 1 wherein the means for securing is a bolt engaged in the support.

7. The connecting device defined in claim 6 wherein the bridge is rotatable on the bolt.

8. The connecting device defined in claim 1 wherein the traction means is a threaded fastener engaged between the inner ends of the jaws and extending across the inner split.

9. The connecting device defined in claim 1, further comprising a flexible tie engaged between the outer ends of the jaws and extending across the outer slit.

10. A frame assembly comprising:
   an elongated frame element;
   a generally stationary support;
   a pair of like elongated clamping jaws extending generally parallel to and spaced from each other, having inner and outer ends, and formed with confronting recesses embracing the element with the jaws separated by inner and outer slits extending oppositely from the recesses toward the respective ends of the jaws, the outer ends of the jaws being formed with respective oppositely directed ribs;
   traction means connected between the inner ends of the jaws for drawing the jaws together at the inner slit while urging the jaws and ribs apart at the outer slit and for thereby clamping the element between the jaws; and
   a bridge having a pair of sides one of which is formed with a pair of confronting and relatively nondisplaceable hooks engaging over the ribs, whereby spreading of the jaws at the ribs engages the jaws tightly in the bridge, the other side being formed with a pair of spaced arms extending away from the one side and embracing the support, the hooks and arms being integral and the bridge being limitedly elastically flexible so that as the jaws are urged apart by the ribs the arms move together and tightly grip the support.

11. The frame assembly defined in claim 10 wherein the support is formed with a respective pair of such ribs directed away from each other and the arms are formed as such hooks engaged over the ribs of the support.

* * * * *